United States Patent
Kanazawa et al.

(10) Patent No.: US 8,257,471 B2
(45) Date of Patent: Sep. 4, 2012

(54) EXHAUST-GAS CONVERTING APPARATUS

(75) Inventors: Takaaki Kanazawa, Toyota (JP);
Keisuke Sano, Susono (JP); Kazuhiro Wakao, Susono (JP); Kimikazu Yoda, Susono (JP); Takaaki Itou, Mishima (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 400 days.

(21) Appl. No.: 12/531,890

(22) PCT Filed: Mar. 26, 2008

(86) PCT No.: PCT/JP2008/055732
§ 371 (c)(1),
(2), (4) Date: Sep. 18, 2009

(87) PCT Pub. No.: WO2008/117829
PCT Pub. Date: Oct. 2, 2008

(65) Prior Publication Data
US 2010/0101421 A1  Apr. 29, 2010

(30) Foreign Application Priority Data
Mar. 26, 2007  (JP) ................................. 2007-079710

(51) Int. Cl.
*B01D 53/28* (2006.01)
*B01D 53/56* (2006.01)

(52) U.S. Cl. ........................... 96/132; 423/239.2; 502/77

(58) Field of Classification Search .................... 95/117, 95/129; 96/132; 423/239.1, 239.2, DIG. 22, 423/DIG. 25, DIG. 27; 502/60, 77, 78
See application file for complete search history.

(56) References Cited

U.S. PATENT DOCUMENTS

| | | | |
|---|---|---|---|
| 4,985,210 A * | 1/1991 | Minami | 422/169 |
| 5,520,895 A | 5/1996 | Sharma et al. | |
| 6,147,023 A | 11/2000 | Hirayama et al. | |
| 7,501,105 B2 * | 3/2009 | Nagata et al. | 423/213.2 |
| 2006/0014630 A1 | 1/2006 | Matsumoto et al. | |

FOREIGN PATENT DOCUMENTS

| | | |
|---|---|---|
| CN | 1711135 A | 12/2005 |
| JP | 8-299756 | 11/1996 |
| JP | 10-77831 | 3/1998 |
| JP | 2000-312827 | 11/2000 |

(Continued)

OTHER PUBLICATIONS

Machine generated English translation of JP 10-077831, published Mar. 1998.*
Machine generated English translation of JP 2006-027938, published Feb. 2006.*

(Continued)

*Primary Examiner* — Frank Lawrence, Jr.
(74) *Attorney, Agent, or Firm* — Finnegan, Henderson, Farabow, Garrett & Dunner, LLP

(57) ABSTRACT

A moisture adsorbing device 1 comprising a type Y zeolite, and an $NO_x$ adsorbing device 2 being put in place on an exhaust-gas downstream side of the moisture adsorbing device 1, and comprising a zeolite that includes a transition metal ion in the cation exchange sites are included. In $NO_x$ adsorbing apparatuses, since the less the moisture content in exhaust gases is the more the $NO_x$ adsorbing capability improves, the NO adsorbing capability in low-temperature region is improved especially by means of the combination with a moisture adsorbing device that comprises a type Y zeolite whose $Al_2O_3$ proportion is great and whose moisture adsorbing amount is great compared with the other zeolites.

4 Claims, 3 Drawing Sheets

FOREIGN PATENT DOCUMENTS

| | | |
|---|---|---|
| JP | 2001-120951 | 5/2001 |
| JP | 2001-289035 | 10/2001 |
| JP | 2002-321912 | 11/2002 |
| JP | 2002-349247 | 12/2002 |
| JP | 2006-27938 | 2/2006 |

OTHER PUBLICATIONS

Extended European Search Report for EP Appl. No. 08738920.1 dated Mar. 8, 2011.

Notification of Reasons for Refusal for JP Patent Application No. 2007-079710 dated Jun. 10, 2011.

* cited by examiner

EXHAUST-GAS CONVERTING APPARATUS

CROSS-REFERENCE TO RELATED APPLICATIONS

This application is a national phase application of International Application No. PCT/JP2008/055732, filed Mar. 26, 2008, and claims the priority of Japanese Application No. 2007-079710, filed Mar. 26, 2007, the contents of both of which are incorporated herein by reference.

TECHNICAL FIELD

The present invention relates to an exhaust-gas converting apparatus that can suppress the emission of $NO_x$ in low-temperature region at the time of starting.

BACKGROUND ART

By means of the strengthening of automotive exhaust-gas regulations, the developments of catalysts for converting exhaust gas have advanced, and thereby the emission amounts of HC, CO and $NO_x$ in exhaust gases have been becoming extremely less recently. As for these catalysts for converting exhaust gas, the following are representative ones: three-way catalysts that are used at air-fuel ratios that are controlled in the vicinity of stoichiometry; and $NO_x$ storage-and-reduction catalysts that are used in atmospheres that are turned into rich atmosphere during lean atmosphere intermittently.

However, since these catalysts for converting exhaust gas are those in which Pt, Rh and the like are adapted into the active metals, the catalytic activities are not generally expressed until they reach the activation temperatures of 200° C. or more, and they are associated with such a problem that the harmful components have been emitted without ever being converted in low-temperature region such as at the time of starting.

Hence, the following have been carried out: an adsorption material, such as zeolite, is put in place on an upstream side of a catalyst for converting exhaust gas; the harmful components are captured onto the adsorption material in low-temperature region; and the harmful components are eliminated from the adsorption material after the catalyst for purifying exhaust gas has undergone temperature rise to the activation temperature or more, and then they are converted with a downstream-side catalyst for converting exhaust gas.

For example, in Japanese Unexamined Patent Publication (KOKAI) Gazette No. 2000-312,827, there is set forth a catalyst for converting exhaust gas, catalyst in which a front-stage catalyst with Rh being supported on a zeolite is put in place on an exhaust-gas upstream side, and a rear-stage catalyst with Pt or Pd being supported is put in place on a downstream side thereof. In accordance with this catalyst for converting exhaust gas, $NO_x$ adsorb onto the front-stage catalyst in low-temperature region, and $NO_x$, which have been eliminated from the front-stage catalyst in high-temperature region, are then converted by means of reduction at the rear-stage catalyst.

However, in low-temperature $NO_x$ adsorption materials that utilize zeolites, such as the front-stage catalyst as set forth in the aforementioned gazette, there have been such a phenomenon that, due to the influence of moisture that is included in exhaust gases, the $NO_x$ adsorption amount lowers. Hence, in Japanese Patent Publication Gazette No. 3,636,116, there is proposed an exhaust converter in which a moisture trap is disposed on an upstream side of a low-temperature $NO_x$ adsorption material. According to that gazette, the moisture content in exhaust gases that flow into the low-temperature $NO_x$ adsorption material is controlled to 0.4%-2.4% approximately by means of the moisture trap; and accordingly $NO_x$ adsorption amount of the low-temperature $NO_x$ adsorption material augments; and thereby it is possible to reduce the release of unconverted $NO_x$ considerably at the time of low temperatures.

According to the studies by the present-application inventors, it became apparent that the lowering degree of $NO_x$ adsorption amount by means of moisture differs depending on the types of $NO_x$ adsorption material. And, it was found that $NO_x$ adsorption materials comprising zeolites in which transition metal ions are supported by means of ion exchange adsorb $NO_x$ in an extremely great amount in low-temperature region; however, it became apparent that, in such $NO_x$ adsorption materials, the less the moisture content in exhaust gas that flows in is the more the $NO_x$ adsorption amount augments.

In Japanese Patent Publication Gazette No. 3,636,116, although silica gel, activated carbon, alumina, type A zeolite, and the like, are exemplified as the moisture trap, these moisture traps are not practical because it is difficult to set the moisture contents in exhaust gases that flow into the $NO_x$ adsorption material to 0.4%-2.4% or less, or because they are associated with such a drawback that the hydrothermal resistance is low, though it is feasible for them to trap moisture sufficiently.

The present invention is one which has been done in view of the aforementioned circumstances, and it is an assignment to be solved to make an exhaust-gas converting apparatus that can adsorb a great amount of $NO_x$ in low-temperature region by using an $NO_x$ adsorption material comprising a zeolite that includes a transition metal ion and then selecting a moisture adsorption material that is optimum for it.

DISCLOSURE OF THE INVENTION

A characteristic of an exhaust-gas converting apparatus according to the present invention which solves the aforementioned assignment lies in that it includes:

a moisture adsorbing device comprising a type Y zeolite; and an $NO_x$ adsorbing device being put in place on an exhaust-gas downstream side of the moisture adsorbing device, and comprising a zeolite that includes a transition metal ion in the cation exchange sites.

It is desirable that the moisture adsorbing device can include at least one of an alkali metal ion and an alkaline-earth metal ion in the cation exchange sites. Moreover, it is desirable that the transition metal ion that is included in the $NO_x$ adsorbing device can be an iron ion.

BEST MODE FOR CARRYING OUT THE INVENTION

Figure 1:
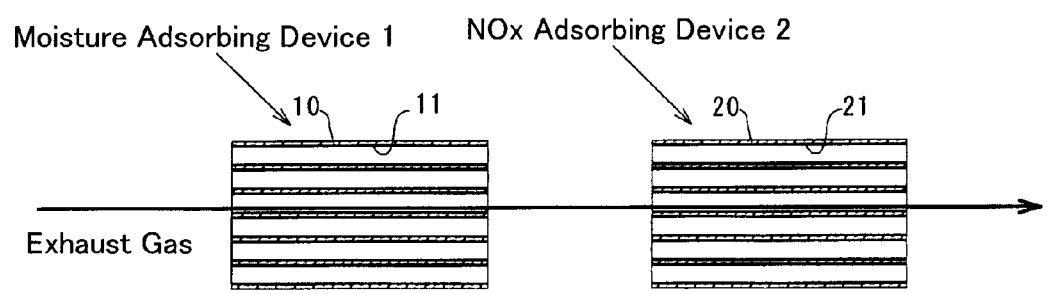
FIG. 1 is a schematic diagram for illustrating a construction of an exhaust-gas converting apparatus according to the present invention.

In an exhaust-gas converting apparatus according to the present invention, a moisture adsorbing device, and an $NO_x$ adsorbing device are put in place from the upstream side of exhaust gas toward the downstream side in this order. The moisture adsorbing device comprises a type Y zeolite. Moisture ($H_2O$) is adsorbed onto the Al-positions of the zeolite; but it is feasible to synthesize the type Y zeolite even when an $SiO_2/Al_2O_3$ molar ratio is 15 or less; and the $Al_2O_3$ proportion is great; and the adsorption amount of moisture is great, compared with the other zeolites. Moreover, although the hydrothermal resistance lowers in zeolites whose $Al_2O_3$ proportion is too much, the $SiO_2/Al_2O_3$ molar ratio of the type Y zeolite being used herein is 5 or more, and the hydrothermal resistance is also satisfied.

Moreover, in the $NO_x$ adsorbing device comprising a zeolite that includes a transition metal ion in the cation exchange sites, the less the moisture amount in exhaust gas is the more the $NO_x$ adsorbing capability improves.

Therefore, when exhaust gases are in low-temperature region, the moisture adsorption amount at the moisture adsorbing device is great, and accordingly it is possible to make moisture in the exhaust gases that flow into the $NO_x$ adsorbing device zero virtually. By means of this, a great amount of $NO_x$ can be adsorbed at the $NO_x$ adsorbing device, and thereby it is possible to securely prevent the emission of $NO_x$ in low-temperature region.

And, when using a type Y zeolite that includes at least one of an alkali metal ion and an alkaline-earth metal ion in the cation exchange sites for the moisture adsorbing device, the moisture adsorbing performance, and the hydrothermal resistance improves furthermore.

Moreover, when the transition metal ion that is included in the $NO_x$ adsorbing device is adapted into an iron ion, since the less the moisture content in exhaust gas is the more especially the $NO_x$ adsorbing capability improves, the $NO_x$ adsorbing capability in low-temperature region improves furthermore by means of the combination with the moisture adsorbing device that comprises the type Y zeolite.

The moisture adsorbing device comprises the type Y zeolite. As for so-called hydrophilic zeolite, type A zeolites, type X zeolites, and type Y zeolites have been known. However, zeolites excepting type Y zeolites are associated with a drawback in view of the hydrothermal resistance as specified in Table 1, and accordingly it is difficult to use them for exhaust-gas conversion.

As for the type Y zeolites, the following have been known: H—Y type ones in which $H^+$ exists in the cation exchange sites; Na—Y type ones in which $Na^+$ exists in the cation exchange sites, and the like. Although it is possible to use any one of them, it is preferable to use a type Y zeolite that includes at least one of an alkali metal ion and alkaline-earth metal ion in the cation exchange sites. By doing thusly, the hydrothermal resistance improves furthermore as specified in Table 1. Moreover, in the H—Y type ones whose cation exchange sites are vacant, there might arise a case where the crystals are unstable thermally, and a case where HC in exhaust gas undergo caulking due to the presence of $H^+$ and thereby the enclosure of pores occurs. Note that, as the respective zeolites being used in Table 1, those whose $SiO_2/Al_2O_3$ molar ratio is 10 or less are selected.

TABLE 1

| Zeolite Species | $H_2O$ Adsorbability | Hydrothermal Resistance | HC Adsorbability | Caulking Resistance |
|---|---|---|---|---|
| Type A | ◎ | X | Δ | — |
| Type X | ◎ | X | ○ | — |
| Type H-Y | ○ | Δ-○ | ◎ | X |
| Type Na-Y | ○ | ○ | ◎ | ○ |

As the moisture adsorbing device, although it is possible to use one which is made by molding the type Y zeolite into a pelletized shape and then filling it up in a container, it is desirable to make it into a honeycomb configuration in order to prevent the enlargement of pressure loss. In this case, although it is allowable to form a honeycomb body of a ceramic powder that includes the type Y zeolite, there might arise such a case that the resulting strength becomes deficient. Hence, it is desirable to use a monolithic substrate, which comprises cordierite or the like that has been used widely as a substrate of catalyst for converting exhaust gas, and then form a coating layer, which comprises the type Y zeolite, onto cellular partition-wall surfaces thereof.

The $NO_x$ adsorbing device comprises the zeolite that includes a transition metal ion in the cation exchange sites. As for the zeolite that is used for the $NO_x$ adsorbing device, ZSM-5, mordenite, and zeolite beta are recommended. When it is a type Y zeolite or ferrierite, the ion exchange of the transition metal ion becomes difficult, and accordingly the resulting $NO_x$ adsorbing capability has become low considerably. Moreover, when it is a type A zeolite or type X zeolite, it is associated with a problem in view of the hydrothermal resistance as described above.

Moreover, the zeolite that is used for the $NO_x$ adsorbing device, those whose $SiO_2/Al_2O_3$ molar ratio is 200 or less is desirable. Since the cation exchange sites exist sufficiently by means of this, it is possible to have it include the transition metal ion sufficiently.

Figure 2:
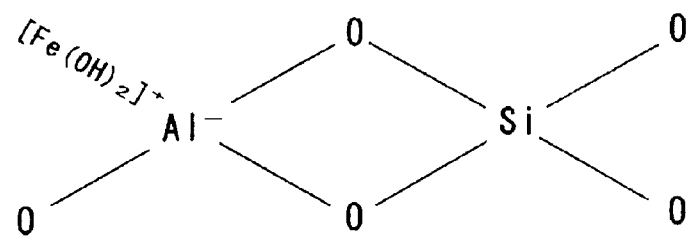
FIG. 2 is an explanatory diagram for illustrating a presumed state of a cation exchange site in an $NO_x$ adsorbing device that was used in the present invention.

As for the transition metal, although it is possible to use Fe, Co and the like, Fe is especially desirable. In the case of subjecting Fe to ion exchange, it is preferable to use ferric chloride ($FeCl_3$) as a starting material. Since ferric chloride ($FeCl_3$) sublimes at 300° C. or more, it can enter the microfine vacant holes inside zeolite, and accordingly it undergoes ion exchange to almost all of the cation exchange sites. Note that, since it is possible to have it include Fe ions with respect to Al in 1:1 by the number of their atoms, it is believed that Fe is included in such a form as illustrated in FIG. 2.

As the $NO_x$ adsorbing device, although it is possible to use one which is made by molding the zeolite including the transition metal ion into a pelletized shape and then filling it up in a container, it is desirable to make it into a honeycomb configuration, in the same manner as the moisture adsorbing device, in order to prevent the enlargement of pressure loss. In this case, although it is allowable to form a honeycomb body of a ceramic powder that includes the zeolite including the transition metal ion, there might arise such a case that the resulting strength becomes deficient. Hence, it is desirable to use a monolithic substrate, which comprises cordierite or the like that has been used widely as a substrate of catalyst for converting exhaust gas, and then form a coating layer, which comprises the zeolite that includes the transition metal ion, onto cellular partition-wall surfaces thereof.

It is possible to put the exhaust-gas converting apparatus according to the present invention on an exhaust-gas upstream of a catalyst for converting exhaust gas, such as a three-way catalyst, for instance, in order to use. However, in a case where the $NO_R$ adsorption amount of the $NO_R$ adsorbing device is great, NO that have been eliminated in high-temperature region cannot be reduced fully with the downstream side catalyst for converting exhaust gas, and accordingly there arises such a drawback that an excessive proportion of $NO_R$ has been emitted in an instance like that.

Hence, it is desirable to form a bypass flow passage independently of a usual main exhaust-gas flow passage and then put the exhaust-gas converting apparatus according to the present invention in place in the bypass flow passage. And, when exhaust gases are low temperatures, such as 200° C. or less, for instance, it is desirable to let the exhaust gases distribute through the bypass flow passage only in order to suppress the emission of NO by adsorbing $NO_R$ onto the $NO_R$ adsorbing device; whereas, in high-temperature range, it is desirable to flow exhaust gases through the main exhaust-gas flow passage, and additionally to connect the bypass flow passage to an EGR, thereby returning $NO_R$, which have been released from the exhaust-gas converting apparatus according to the present invention, to an engine.

Note that it is feasible for HC with relatively high boiling points to adsorb onto the type Y zeolite of the moisture adsorbing device. Therefore, when one which can adsorb HC with low boiling points, such ZSM-5, is used for the zeolite of the $NO_R$ adsorbing device, it is possible to successfully adsorb HC in exhaust gases, from those with high boiling points to those with low boiling points, in low-temperature region. Therefore, by putting the exhaust-gas converting apparatus according to the present invention in place in the bypass flow passage as aforementioned, it is possible to suppress the emission of HC and $NO_x$ by adsorbing them in low-temperature region; whereas it is possible to react both of them to convert them upon returning them to the engine at the time of high temperatures.

EXAMPLES

Hereinafter, the present invention will be explained in detail by means of examples, comparative examples, and testing examples.

Example No. 1

In FIG. 1, an exhaust-gas converting apparatus according to the present example is illustrated. This exhaust-gas converting apparatus comprises a moisture adsorbing device 1 that is disposed in an exhaust-gas flow passage, and an $NO_x$ adsorbing device 2 that is put in place on an exhaust-gas downstream side thereof. The moisture adsorbing device 1 comprises a honeycomb substrate 10 that is made of cordierite, and a coating layer 11 that is formed on cellular partition-wall surfaces thereof; and the coating layer 11 is constituted of a type Na—Y zeolite. Moreover, the $NO_x$ adsorbing device 2 comprises a honeycomb substrate 20 that is made of cordierite, and a coating layer 21 that is formed on cellular partition-wall surfaces thereof; and the coating layer 21 is constituted of ZSM-5 that has been underwent ion exchange with Fe.

First of all, a type Na—Y zeolite whose $SiO_2/Al_2O_3$ molar ratio was 5.6 was made ready, and was then mixed with an $SiO_2$-system binder and pure water to prepare a slurry. This slurry was wash coated onto a 35-c.c. honeycomb substrate 10 that was made of cordierite, was dried and then calcined to form a 6.3-g coating layer 11, and was labeled a moisture adsorbing device 1.

Whereas, ZSM-5 whose $SiO_2/Al_2O_3$ molar ratio was 28 was made ready, and was then impregnated with a predetermined amount of an aqueous solution in which $FeCl_3$ was dissolved. This was held at 400° C. for 2 hours in an electric furnace, and then ion exchange was carried out so that Fe and Al made such amounts as 1:1 by atomic ratio, thereby preparing an Fe/ZSM-5 powder. Subsequently, the Fe/ZSM-5 powder was mixed with an $SiO_2$-system binder and pure water to prepare a slurry. This slurry was wash coated onto a 35-c.c. honeycomb substrate 20 that was made of cordierite, was dried and then calcined to form a 6.3-g coating layer 21, and was labeled an $NO_x$ adsorbing device 2.

Comparative Example No. 1

The same $NO_x$ adsorbing device 2 as that of Example No. 1 was put in place on an exhaust-gas flow upstream side, the same moisture adsorbing device 1 as that of Example No. 1 was then put in place on an exhaust-gas flow downstream side of the $NO_x$ adsorbing device 2, and was labeled an exhaust-gas converting apparatus according to Comparative Example No. 1.

<Test-Evaluation>

With respect to each of the exhaust-gas converting apparatuses according to Example No. 1 and Comparative Example No. 1, a model gas given in Table 2 was distributed at a temperature of 50° C. in a flow volume of 10 L/min. for 20 seconds, and then HC adsorption rates and NO adsorption rates were measured from the differences between inlet gas concentrations and outlet gas concentrations. The results are given in Table 3.

TABLE 2

| $C_3H_6$ (ppmC) | $C_6H_5CH_3$ (ppmC) | NO (ppm) | CO (ppm) | $H_2O$ (%) | $N_2$ |
|---|---|---|---|---|---|
| 1500 | 1500 | 900 | 6000 | 3 | Balance |

TABLE 3

| | Upstream Side | Downstream Side | Adsorption Rate (%) HC | NO |
|---|---|---|---|---|
| Ex. No. 1 | Moisture Adsorbing Device | $NO_x$ Adsorbing Device | 100 | 100 |
| Comp. Ex. No. 1 | $NO_x$ Adsorbing Device | Moisture Adsorbing Device | 100 | 86 |

From Table 3, in accordance with the exhaust-gas converting apparatus according to Example No. 1, both of HC and NO were adsorbed 100%. On the contrary, in the exhaust-gas converting apparatus according to Comparative Example No. 1, although the HC adsorption rate was 100%, the NO adsorption is lower than that of Example No. 1. Although a major cause of this is that moisture was included in the exhaust gas that flowed into the $NO_x$ adsorbing device 2, it is believed the following was one of the causes, namely, the adsorption of NO was hindered because of $C_6H_5CH_3$ being adsorbed onto the $NO_x$ adsorbing device 2.

Testing Example No. 1

Only the same $NO_x$ adsorbing device 2 as that of Example No. 1 was used, and $H_2O$ was first adsorbed onto it fully. Thereafter, it was heated at three levels, namely, at 160° C., 230° C. and 350° C., for 2 hours, respectively, thereby eliminating (or purging) the adsorbed $H_2O$. The higher the heating temperature was the less the remaining $H_2O$ was. Thereafter, a mixture gas comprising NO and $N_2$ was distributed immediately to measure the adsorption rates of NO.

Figure 3:
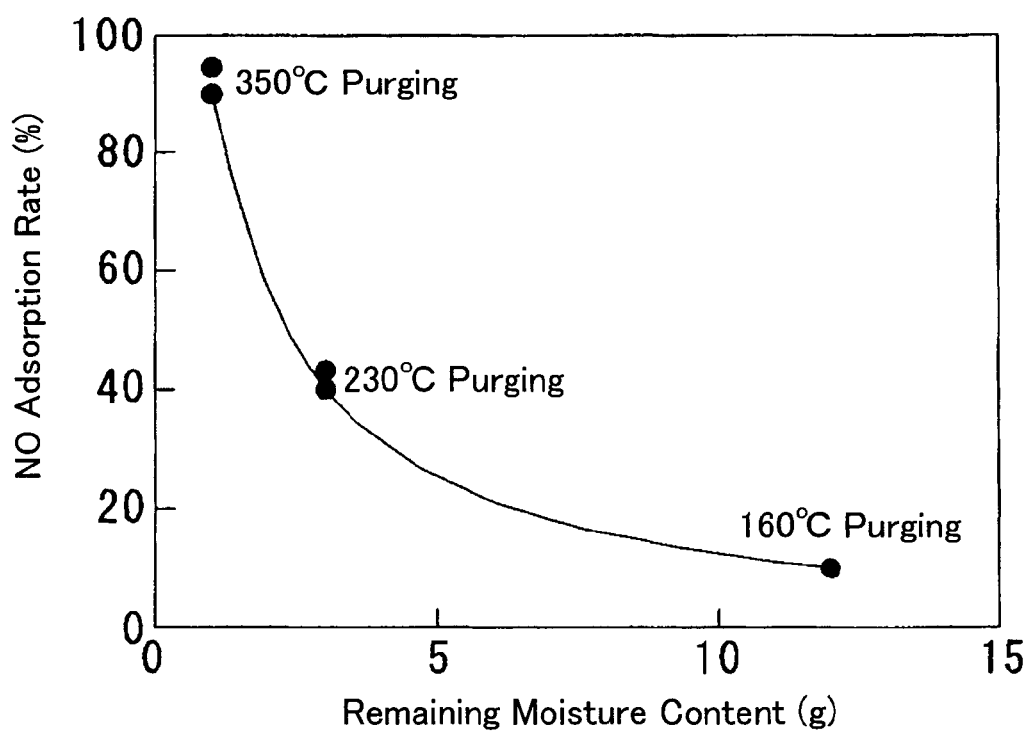
FIG. 3 is a graph for illustrating a relationship between remaining moisture contents and NO adsorption rates in the $NO_x$ adsorbing device.

The results are illustrated in FIG. 3.

From FIG. 3, it is understood that the higher the purging temperature is, that is, the less the adsorption amount of $H_2O$ is, the higher the NO adsorption rate is.

Testing Example No. 2

A coating layer that comprised a type A zeolite was formed in an amount of 160 g onto a honeycomb substrate (900 c.c.) that was made of cordierite, thereby preparing a moisture adsorbing device. Upon mounting this moisture adsorbing device into an exhaust system of actual engine and then measuring the $H_2O$ emission amount at the time of LA#4 travelling continuously, the emission of $H_2O$ was suppressed completely for a time period of about 20 seconds since the time of starting. This means that the entire amount of $H_2O$, which was emitted during that period, was absorbed onto the coating layer.

Testing Example No. 3

Figure 4:
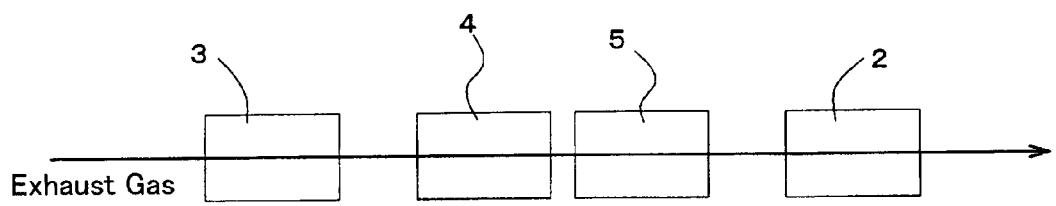
FIG. 4 is a schematic explanatory diagram of an exhaust-gas converting apparatus that was used in Testing Example No. 3, Example No. 2 and Comparative Example No. 2.

In the exhaust system of actual engine set forth in Testing Example No. 2, a first HC adsorbing device 4 that comprised a mixture of ZSM-5 and a type Y zeolite, and a second HC adsorbing device 5 that had been completed by subjecting ferrierite to ion exchange with Ag were put in place on an exhaust-gas downstream side of the moisture adsorbing device 3 that had been prepared in Testing Example No. 2, as illustrated in FIG. 4; and the same $NO_x$ adsorbing device 2 as that of Example No. 1 was put in place on a furthermore downstream side of them. And, the $NO_x$ emission amount at the time of LA#4 travelling was measured continuously from the time of starting. Note that, regarding the following cases as well: a case of excepting the moisture adsorbing device 3 and another case of excepting both of the moisture adsorbing device 3 and $NO_x$ adsorbing device 2; the $NO_x$ emission amounts were measured similarly; and the results are illustrated in FIG. 5.

Figure 5:
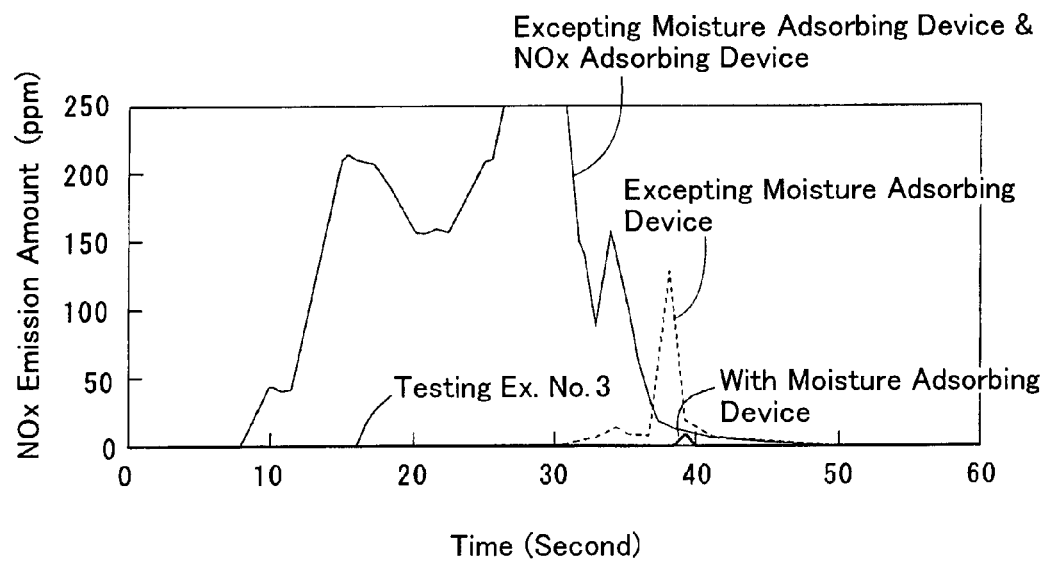
FIG. 5 illustrates results in Testing Example No. 3, and is a graph for illustrating the changes of $NO_x$ emission amount with time since the time of starting.

From FIG. 5, it is possible to suppress the emission of $NO_x$ almost completely by putting the moisture adsorbing device 3 in place on an upstream side of the $NO_x$ adsorbing device 2. Specifically, it is apparent that it is possible to adsorb $NO_x$ almost completely by letting exhaust gases from which moisture has been removed flow into the $NO_x$ adsorbing device 2. Note that, although it was possible to suppress the $NO_x$ emission amount to a certain extent even in the case of excepting the moisture adsorbing device 3, this is believed to arise because moisture adsorbed onto the first HC adsorbing device 4 and second HC adsorbing device 5 to a certain extent.

Note that, in the case of putting both of the moisture adsorbing device 3 and $NO_x$ adsorbing device 2 in place, it was possible to secure the 0.3% $NO_x$ emission amount on average as a whole during the mode at the time of LA#4 travelling.

Example No. 2

In the same manner as Example No. 1, a coating layer that comprised a type Na—Y zeolite was formed in an amount of 160 g onto a honeycomb substrate (900 c.c.) that was made of cordierite, thereby preparing a moisture adsorbing device 3. Moreover, except that a 900-c.c. honeycomb substrate 20 that was made of cordierite was used, an $NO_x$ adsorbing device 2 that possessed the 160-g coating layer 21 was prepared in the same manner as Example No. 1.

These moisture adsorbing device 3 and $NO_x$ adsorbing device 2 were put in place into an exhaust system of actual engine along with the HC adsorbing device 4 in the same manner as Testing Example No. 3, and then the $NO_x$ emission amount was measured all through during the entire mode at the time of LA#4 travelling to compute the NO adsorption rate. The results are given in Table 4.

Comparative Example No. 2

Except that no moisture adsorbing device 3 was put in place, the $NO_x$ adsorption rate was measured in the same manner as Example No. 2. The results are given in Table 4.

<Evaluation>

TABLE 4

|  | Upstream Side | Downstream Side | $NO_x$ Adsorption Rate (%) |
|---|---|---|---|
| Ex. No. 2 | Moisture Adsorbing Device | $NO_x$ Adsorbing Device | 94% or more |
| Comp. Ex. No. 2 | — | $NO_x$ Adsorbing Device | 0-90% |

From Table 4, whereas the $NO_x$ adsorption rate fluctuated in comparative Example No. 2, the $NO_x$ adsorption rate of 94% or more was always secured in Example No. 2. It is believed that this was caused by the presence or absence of the moisture adsorbing device 3, and that the fluctuation of the $NO_x$ adsorption rate in Comparative Example No. 2 resulted from the influence of moisture in the exhaust gases. It is apparent that, in Example No. 2, namely, in the counterpart, the high $NO_x$ adsorption rate could be secured because the exhaust gases, which did not include any moisture due to the moisture adsorbing device 3, flowed into the $NO_x$ adsorbing device 3.

INDUSTRIAL APPLICABILITY

It is possible for the exhaust-gas converting apparatus according to the present invention to suppress the emission of $NO_x$ greatly in low-temperature region, such as at the time of starting, by putting it in place on an exhaust-gas upstream side of a catalyst for converting exhaust gas, such as three-way catalysts and $NO_x$ storage-and-reduction catalysts.

The invention claimed is:

1. An exhaust-gas adsorbing apparatus being characterized in that it includes:
   a moisture adsorbing device comprising a type Y zeolite whose $SiO_2/Al_2O_3$ molar ratio is 5 or more; and
   an $NO_x$ adsorbing device being put in place on an exhaust-gas downstream side of the moisture adsorbing device, and comprising a zeolite that includes a transition metal ion in the cation exchange sites and is selected from the group consisting of ZSM-5, mordenite and zeolite beta.

2. The exhaust-gas adsorbing apparatus as set forth in claim 1, wherein said moisture adsorbing device includes at least one of an alkali metal ion and an alkaline-earth metal ion in the cation exchange sites.

3. The exhaust-gas adsorbing apparatus as set forth in claim 1, wherein the transition metal ion that is included in said $NO_x$ adsorbing device is an iron ion.

4. The exhaust-gas adsorbing apparatus as set forth in claim 1, wherein the type Y zeolite is Na—Y zeolite containing no transition metals.

* * * * *